United States Patent [19]

Kawakami et al.

[11] 4,318,181
[45] Mar. 2, 1982

[54] TIMER DISPLAY APPARATUS

[75] Inventors: Ryuichi Kawakami, Kanagawa; Kenichi Nakazawa, Tokyo, both of Japan

[73] Assignee: Sony Corporation, Tokyo, Japan

[21] Appl. No.: 112,455

[22] Filed: Jan. 16, 1980

[30] Foreign Application Priority Data

Jan. 26, 1979 [JP] Japan .................................. 54-8593

[51] Int. Cl.³ ............................................ H01H 43/00
[52] U.S. Cl. ................................ 364/569; 340/309.1; 364/144
[58] Field of Search ...................... 364/104, 400, 569; 455/181, 186; 340/309.1, 309.3; 307/38, 141, 141.4

[56] References Cited

U.S. PATENT DOCUMENTS 3,903,515  9/1975  Haydon et al. ................. 364/104 X
3,936,752  2/1976  Sasabe et al. ........................ 455/181
4,031,470  6/1977  Kokado et al. .............. 340/309.1 X
4,193,120  3/1980  Yello ............................... 364/104 X
4,228,543 10/1980  Jackson ............................... 455/181

Primary Examiner—Jerry Smith
Attorney, Agent, or Firm—Hill, Van Santen, Steadman, Chiara & Simpson

[57] ABSTRACT

A timer display apparatus is disclosed which has a timer time display member, a memory capable of memorizing a plurality of timer times and a discriminating circuit which compares the memorized timer times in the memory with the present or instant time and then discriminates the timer time of the memorized timer times nearest but after the instant time. Then, based upon the output from the discriminating circuit, the timer time nearest but after the instant time is read out from the memory and displayed on the timer time display member.

2 Claims, 4 Drawing Figures

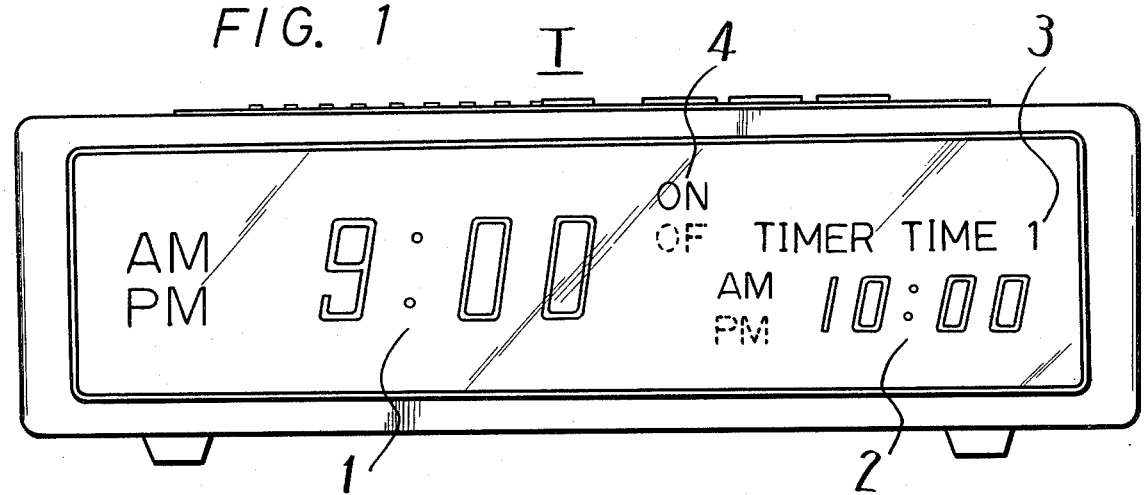
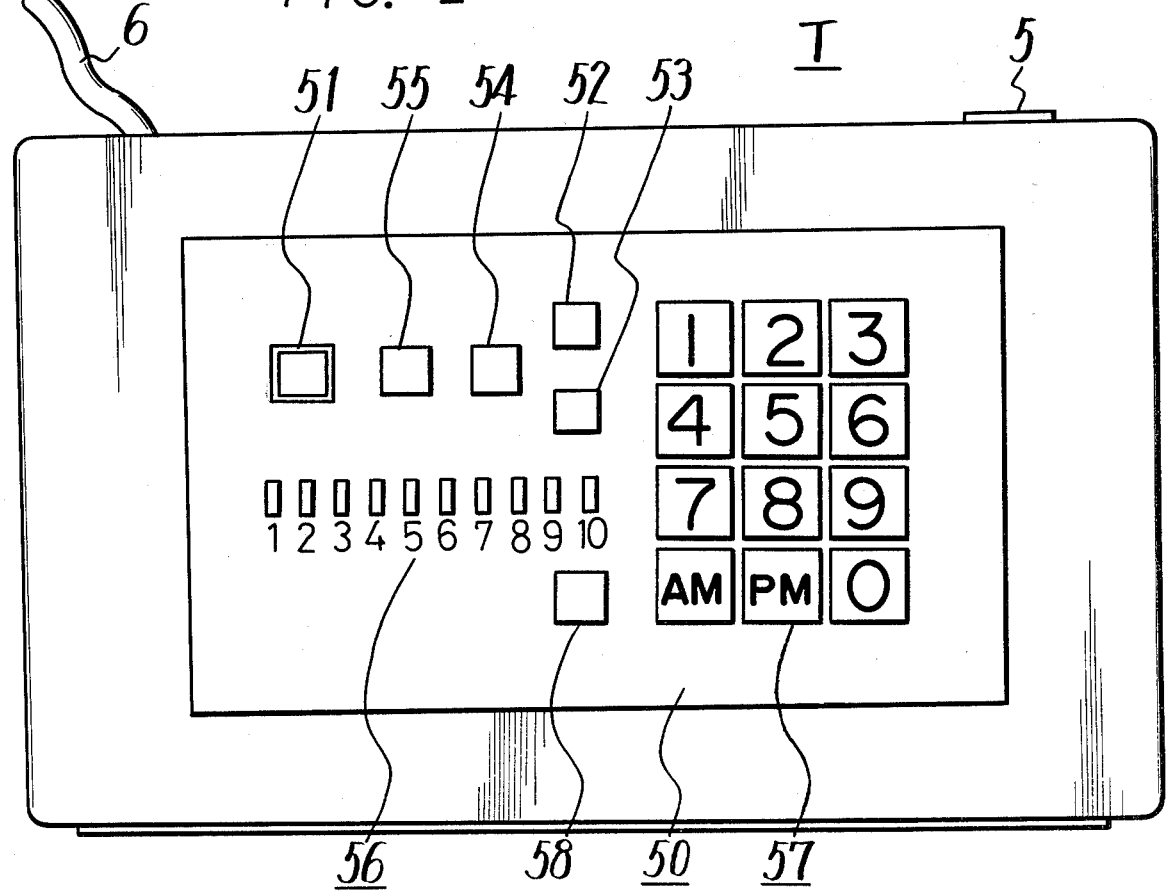

TIMER DISPLAY APPARATUS

BACKGROUND OF THE INVENTION

1. Field of the Invention

The present invention relates generally to a timer display apparatus, and is directed more particularly to a timer display apparatus which is capable of setting a plurality of timer times.

2. Description of the Prior Art

In an ordinary timer, a display member which displays a present or instant time is also used as a display member which displays a timer time. For example, the display member displaying the instant time is temporarily changed to display the timer time. When the timer time is plural, the memory buttons corresponding to the plural timer times are pushed down to select a timer time and display the selected timer time on the display member.

However, according to the ordinary timer, the instant time is always displayed on the display member, so that unless the above memory buttons are operated, the timer time can not be displayed on the display member. Accordingly, with a timer in which especially a plurality of timer times are set, it is difficult that a time (including hour and minute) of the timer time after and nearest the instant time is known at once.

OBJECTS AND SUMMARY OF THE INVENTION

Accordingly, an object of the present invention is to provide a novel timer display apparatus free of the defects encountered in the prior art.

Another object of the invention is to provide a timer display apparatus in which the timer time in a plurality of timer times after and nearest an instant time can be automatically displayed.

A further object of the invention is to provide a timer display apparatus by which a timer time is always displayed without operating a timer memory button.

A still further object of the invention is to provide a timer display apparatus in which when times comes to an instant time displayed on a timer time display member, the timer time display member is automatically changed to display the timer time after and nearest the instant time.

According to an aspect of the present invention, a timer display apparatus is provided which comprises:

(a) memory means capable of memorizing a plurality of timer times;

(b) discriminating means for comparing a timer time memorized in said memory means with an instant time and discriminating a timer time after but nearest the instant time; and (c) timer time display means for displaying a timer time after but nearest an instant time which is read out from said memory means based upon an output from said discriminating means.

The other objects, features and advantages of the present invention will become apparent from the following description taken in conjunction with the accompanying drawings through which the like references designate the same elements and parts.

BRIEF DESCRIPTION OF THE DRAWINGS

FIG. 1 is a front view of a clock which is provided with an example of the timer display apparatus according to the present invention;

FIG. 2 is a top plan view of the clock shown in FIG. 1;

DESCRIPTION OF THE PREFERRED EMBODIMENTS

Figure 3:
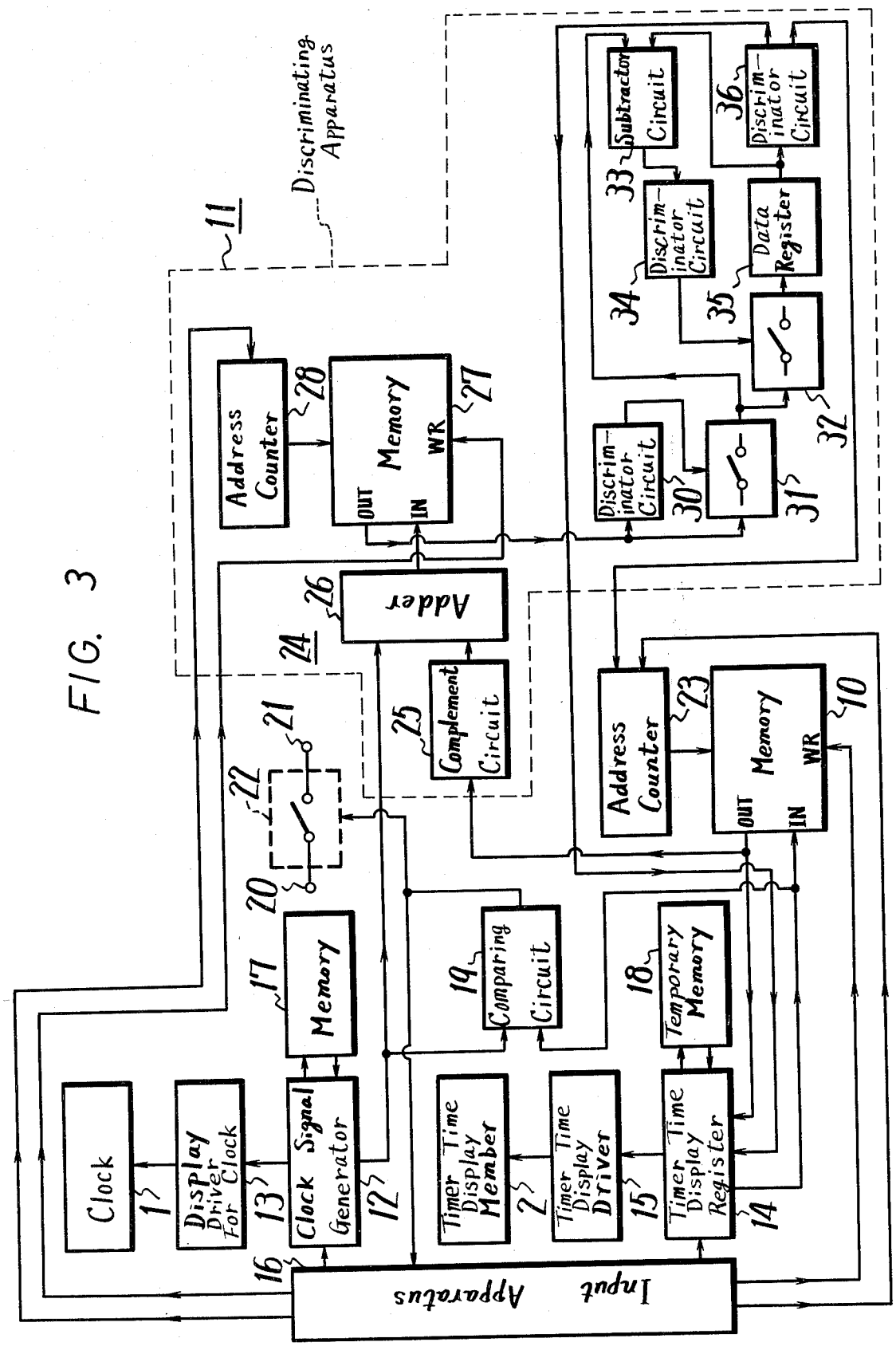
FIG. 3 is a circuit diagram showing an example of the circuit for driving the timer display apparatus according to the invention.

The present invention will be hereinafter described with reference to the attached drawings.

FIG. 1 is a front view of a clock provided with an example of the timer display apparatus according to the present invention. In FIG. 1, reference letter T generally designates the clock, 1 is an instant or present time display member, i.e., a clock, and 2 is a timer time display member of the timer display apparatus of the present invention. In the illustrated example, the timer time display member 2 includes a memory display member 3 and an operation display member 4. In this case, the respective display members 1, 2, 3 and 4 are all made of, for example, phosphor display tubes, liquid crystal display elements or the like. The instant time display member 1 and timer time display member 2 are so formed that AM, PM, hour and minute are selectively displayed thereon. In this case, the hour and minute are digitally displayed. The memory display member 3 functions such that when a timer time is memorized in a memory described later, a memory member in which the timer is memorized is displayed and when the timer time is read out from the memory, a memory member from which the timer time is read out is selectively displayed. In FIG. 1, the words "TIMER TIME" on the left side of the timer display member 3 are always displayed or lit. The operation display member 4 functions such that it shows whether the switch of the timer is made to be ON or OFF when the timer time arrives.

FIG. 2 is a top plan view of the clock T. In FIG. 2, 5 designates a power supply outlet provided on the rear side of the clock T through which outlet 5 power controlled by the timer time display apparatus can be delivered, 6 a power supply cord through which power is supplied to the clock T, and 50 an operating member operating the clock T. This operating member 50 includes a timer control switch 51 made of a push-push switch. When the timer is driven, the switch 51 is pushed down to make ON and OFF of the power source for an electronic instrument connected to the outlet 5 upon a set time in the timer. When the switch 51 is pushed down again, it returns and hence no power is supplied to the electronic instrument even when the set time comes. The operating member 50 further includes an ON-time set button 52 which is pushed down when the ON-time of the timer is set, an OFF-time set button 53 which is pushed down when the OFF-time of the timer is set, a clock set button 55 which is pushed when an instant time of the clock T is set, a timer program button 56 which includes ten buttons marked with FIGS. 1, 2, . . . 10 and pushed when the program of the timer is set, a time set button 57 which consists of buttons with FIGS. 0, 1, 2, . . . , 9 thereon and letters AM and PM and is pushed when the AM, PM and instant time of the timer are set, a clear button 54 which is pushed when the set time of the timer is released or cleared up, and a program end button 58 which is pushed when the time is started after the instant time is set or after the set time is memorized in the memory and then the clear button 54 is pushed. In this case, except the timer control switch 51 of the operating member 50, the other switch buttons thereof are made of non-lock switches.

An example of the circuit for driving the timer time display apparatus of the invention will be now described with reference to FIG. 3. In FIG. 3, 20 and 21 designate output terminals which are connected to the power outlet 5 and between which inserted is a timer switch 22 which will be made ON or OFF when the timer time arrives. A clock signal delivered from a clock signal generator apparatus 12, which will be described later, and a timer time signal from a register 14 are compared by a comparing circuit 19 whose output is supplied to the switch 22. Thus, when the timer time coincides with an instant time, the switch 22 is made ON or OFF in response to the ON or OFF signal accompanied by the timer time signal to control the power supply to the electronic instruments connected to the outlet 5.

In FIG. 3, 16 designates an input apparatus which also serves as a control apparatus for all the timer and which can set a timer time of the timer, correct the clock or the like by operating the operating member 50 and 13 denotes a driver for the clock 1. The clock signal generator 12 includes therein a quartz oscillator, a frequency divider which frequency-divides the oscillation signal from the quartz oscillator to produce an output with the frequency of 1 Hz, and a frequency dividing counter which frequency-divides the signal with the frequency 1 Hz from the frequency divider in accordance with the 10 unit and 1 unit of the hour and the 10 unit and 1 unit of the minute. When the clock signal from the clock signal generator 12 is supplied through the display driver 13 to the clock or display member 1, a present time is displayed on the clock 1. A memory 17 is connected to the clock signal generator 12 which will memorize the contents of the counters at respective units of the clock signal generator 12 or the set time signal from the input apparatus 16. Upon correcting a time, a predetermined time is memorized in the memory 17 and, for example, the contents of the memory 17 are written in the counters of the respective units of the clock signal generator 12 in accordance with the announcement of time from the radio receiver or television receiver.

In FIG. 3, 15 denotes a driver for the timer time display member 2. The register 14 is a timer time display register whose output is supplied through the display driver 15 to the display member 2, so that the timer time in response to the content of the register 14 is displayed on the display member 2. The content of the register 14 is determined by the timer time setting signal from the input apparatus 16 and also by the timer time signal read out from a memory 10 which will be described later. A memory 18 is provided to temporarily memorize the content of the register 14. By using the memory 18, it becomes possible that the content of the register 14 is temporarily memorized, another timer time signal is fed to the register 14 and then a timer time based upon the latter timer time signal can be displayed on the display member 2. Accordingly, in such a case where a certain timer time in a plurality of timer times are memorized in the memory 10, which will be described later, is displayed on the display member 2, if another timer time is displayed on the display member 2 by operating the input apparatus 16, it is sufficient that the timer time signal based upon the timer time displayed on the display member 2 is transferred from the register 14 to the memory 18, another timer time signal read out from the memory 10 is supplied to the register 14 and then the timer time is displayed on the display member 2 based upon the latter timer time signal.

The memory 10 comprises ten memory members capable of memorizing ten timer time signals in the illustrated example. In the memory 10, letters IN represent a write-in input terminal, OUT a read-out output terminal, and WR a write-in and read-out control signal input terminal, respectively. The input terminal WR of the memory 10 is supplied with a write-in and read-out control signal from the input apparatus 16. The output terminal OUT of the memory 10 is connected to the input terminal of the register 14 whose output terminal is connected to the input terminal IN of the memory 10. An address counter 23 is provided for the memory 10, and the address counter 23 is driven by the control signal from the input apparatus 16 and also by the control signal from a discriminator circuit 36 which will be described later.

In FIG. 3, a dotted line block 11 designates a discriminating apparatus which compares the timer time memorized in the memory 10 with a present time and discriminates the timer time after but nearest the present time. The discriminating apparatus 11 will be now described. In the apparatus 11, there is provided a subtractor circuit 24 which consists of a complement circuit 25 and an adder 26. The subtractor circuit 24 is supplied with the clock signal from the clock signal generator 12 at its adder 26 and the timer time signal read out from the memory 10 at its complement circuit 25 and produces a signal representing the time difference therebetween. That is, the clock signal from the clock signal generator 12 is fed directly to the adder 26 and the timer time signal read out and delivered from the output terminal OUT of the memory 10 is fed to the complement circuit 25 whose output is fed to the adder 26. The output or time difference signal from the adder 26 is a time signal which subtracts the timer time from the instant time. A memory 27 is provided which memorizes difference time signals which are provided by sequentially reading out a plurality of timer time signals memorized in the memory 10 and subtracting the same from the clock signal from the clock signal generator 12 to be the difference time signal. Similar to the memory 10, the memory 27 has terminals IN, OUT and WR and also comprises memory members whose number is so selected that the difference times corresponding to the number of the memory members of the timer time memorizable in the memory 10 can be memorized. The output from the adder 26 is supplied to the input terminal IN of the memory 27 and the write-in and read-out control signal from the input apparatus 16 is supplied to the input terminal WR of the memory 27, respectively. An address counter 28 is provided for the memory 27 and controlled by the control signal from the input apparatus 16.

The read-out output from the output terminal OUT of the memory 27 is supplied to a discriminator circuit 30, which discriminates whether the difference time of the read-out difference time signal is negative or not, and also to a switch circuit 31 which is made ON when the difference time of the read-out output from the memory 27 is judged negative by the discriminator circuit 30 to deliver the read out signal but is made OFF when the difference time is other than negative or positive and zero. The output from the switch circuit 31 is fed to another switch circuit 32 whose output is fed to a data register 35. The outputs from the switch circuit 31 and the data register 35 are supplied to a subtractor circuit 33 which is the same as the subtractor circuit 24 in construction and in which the absolute values of the difference times are subtracted with each other. The subtraction output from the subtractor circuit 33 is fed to a discriminator circuit 34. When the discriminator circuit 34 discriminates such that when, between the output from the switch circuit 31 and the output from the data register 35, the absolute value of the difference time of the content in the data register 35 is greater than the absolute value of the difference time of output from the switch circuit 31, the discriminator circuit 34 makes the switch circuit 32 ON to supply the output from the switch circuit 31 to the data register 35 and to exchange the previous data thereof. While, when the discriminator circuit 34 discriminates such that the absolute value of the difference time of the content in the data register 35 is smaller than the absolute value of the difference time of the output from the switch circuit 31, the discriminator circuit 34 makes the switch 32 OFF. The output from the data register 35 is fed to the discriminator circuit 36. Since the memory 27 simultaneously memorizes a signal representing that the difference time signal in the memory 27 corresponds to which order of the respective timer time signal, the discriminator circuit 36 discriminates the order of the difference time signal and controls the address counter 23 for the memory 10 by the discriminated output. Thus, from the memory 10 read out is the timer time signal corresponding to the smallest absolute value of the difference times. The control signal from the discriminator circuit 36 is also supplied to the register 14 such that when a desired timer time signal is read out from the memory 10, this read out output is set in the register 14.

Next, the operation of the timer time display apparatus will be described. As described above, the memory 10 has ten memory members so as to be able to memorize, for example, ten timer times at maximum, so that the memory 27 has ten memory members so as to be capable of memorizing ten difference time signals at maximum. At first, the input apparatus 16, i.e., operating member 50 is operated to set a desired timer time in the register 14. When it is assumed that a desired one of the ten memory members is selected and the corresponding button is operated, the timer time set in the register 14 is displayed on the display member 2 and also supplied to the memory 10 to be written at its pointed memory member. The pointing out of this memory member is carried out by such a manner that the address counter 23 is controlled by the control signal from the input apparatus 16. By the above manner, desired timer times are written in the respective memory members of the memory 10. In this case, it is also written whether the timer switch 22 is made ON or OFF at the timer time. If it is assumed that, for example, ten timer times are written and memorized in the memory 10 in the above manner, then when the above write-in operation is finished, the memory 10 is brought into the read-out state by the write-in and read-out control signal from the input apparatus 16.

Now, it will be described when the timer time displayed on the display member 2 is changed in accordance with an instant time. When the timer time in register 14 coincides with an instant time, the comparator circuit 19 produces a coincident signal which is fed to the switch circuit 22 to change the same and also to the input apparatus 16. Thus, the ten timer time signals memorized in the memory 10 and the clock signal from the clock signal generator 12 are sequentially fed to the subtractor circuit 24 to be subtracted. That is, the respective timer time is always subtracted from an instant time and the difference time signal therebetween is written and memorized in the memory 27. In this case, such a discrimination signal is also memorized simultaneously which discriminates that the time difference signal is the timer time signal memorized in the memory member of the memory 10.

When the write-in operation to the memory 27 is finished, the control signal from the input apparatus 16 is supplied again to the address counter 28. Thus, the contents in the respective memory members of the memory 27 are sequentially read out and then supplied to the discriminator circuit 30 and the switch circuit 31. When the difference time signal is positive or zero, the switch circuit 31 is made OFF by the output from the discriminator circuit 30, while only when the difference time signal is negative, the switch circuit 31 is made ON. If, for example, the difference time signals up to the third are positive, these signals do not pass through the switch circuit 31. While, if the difference time signals after the fourth are all negative, the fourth to tenth difference time signals all pass through the switch circuit 31. At first, the fourth difference time signal is supplied through the switch circuit 31 to the subtractor 33. When the output from the switch circuit 32 is not yet fed to the data register 35, since the data of a time shorter than the possibly smallest value of the difference time of the difference time signal is memorized in the data register 35 as an initial value, in the subtractor 33, the subtraction between the output from the switch circuit 31 and the initial value of the data register 35 is carried out for the fourth difference time signal. Since the output of the switch circuit 31 is subtracted from the output of the data register 35, it is discriminated in the discriminating circuit 34 that the output from the subtractor 33 is negative. Thus, the switch circuit 32 is made ON and hence the fourth difference time signal is fed to the data register 35. Thereafter, the fifth to tenth difference time signals are compared with the output from the data register 35 in the subtractor 33. After the comparison of all the signals is completed, the difference time signal, the absolute value of whose difference time is smallest, remains in the data register 35. When the difference time signal remaining in the data register 35 is supplied to the discriminator circuit 36, it discriminates the order of the memory member of the memory members of the timer time signal in the memory 10 on which a timer time signal corresponding to the difference time signal is memorized. The output from the discriminator circuit 36 controls the address counter 23 to read out the timer time signal from the corresponding memory member of the memory 10. Then, the read out timer time signal is set in the register 14 and then displayed on the display member 2.

Thus, at every time when the comparator circuit 19 delivers the coincident signal, the clock signal representing an instant time and the timer time signal or the content of the memory 10 are compared, and the timer time after and nearest the instant time is displayed on the display member 2. When a timer time signal of a certain order is displayed on the display member 2, if necessary, the content of the register 14 is temporarily fed to the memory 18, a timer time to be ascertained is read out from the memory 10, fed to the register 14 and then displayed on the display member 2. After the above ascertainment is completed, the timer time signal memorized in the memory 18 is again read out and then fed to the register 14 and displayed on the display member 2.

Next, the operation order of the operating member 50 will be described in detail. For the sake of simplifying the explanation, the case where the time set is carried out twice will be described. Such a case will be described where an electronic instrument such as a radio receiver (whose power switch is held ON), is connected to the clock T, is made ON at AM 10 and then made OFF at AM 10:30. At first, for example, the button with the FIG. 1 of the timer program buttons 56 is pushed, then the ON-time set button 52 is pushed, and the time set button 57 is pushed in such a manner that the AM-button is pushed, the 1-button is pushed and then the 0-button is pushed three times (AM, 1, 0, 0, 0). This button operation is set in the register 14, fed to the memory 10 and written at the appointed memory members thereof. Thus, on the timer display member 2 displayed is AM 10:00, on the memory display member 3 displayed is the FIG. 1, and on the operation display member 4 displayed is ON, respectively. The selection of the memory members in the memory 10 is carried out in such a manner that the address counter 23 is controlled by the control signal from the input apparatus 16.

Next, when the button with the FIG. 2 of the timer program button 56 is pushed, the displays on the timer time display member 2, the memory display member 3 and the operation display member 4 disappear, respectively. When the OFF-time button 53 is pushed and the time-set buttons 57 are pushed in the order of AM, 1, 0, 3, 0, the content previously set in the register 14 is transferred to the memory 18 while the time now set is memorized in the memory 10, AM, 10:30 is displayed on the display member 2, the FIG. 2 is displayed on the memory display member 3 and OFF is displayed on the operation display member 4. Next, the program end button 58 is pushed and then the timer control switch 51 is pushed. The above operation is sufficient for the above purpose. Thus, the timer time display member 2 displays AM 10:00, the memory display member 3 displays the FIG. 1, and the operation display member 4 displays ON, respectively. When an instant time arrives at AM 10:00, the radio receiver is made ON. At this time, the display on the timer time display member 2 is changed to AM 10:30, the display on the memory display member 3 displays the FIG. 2, and the display on the operation display member 4 becomes OFF.

Figure 4:
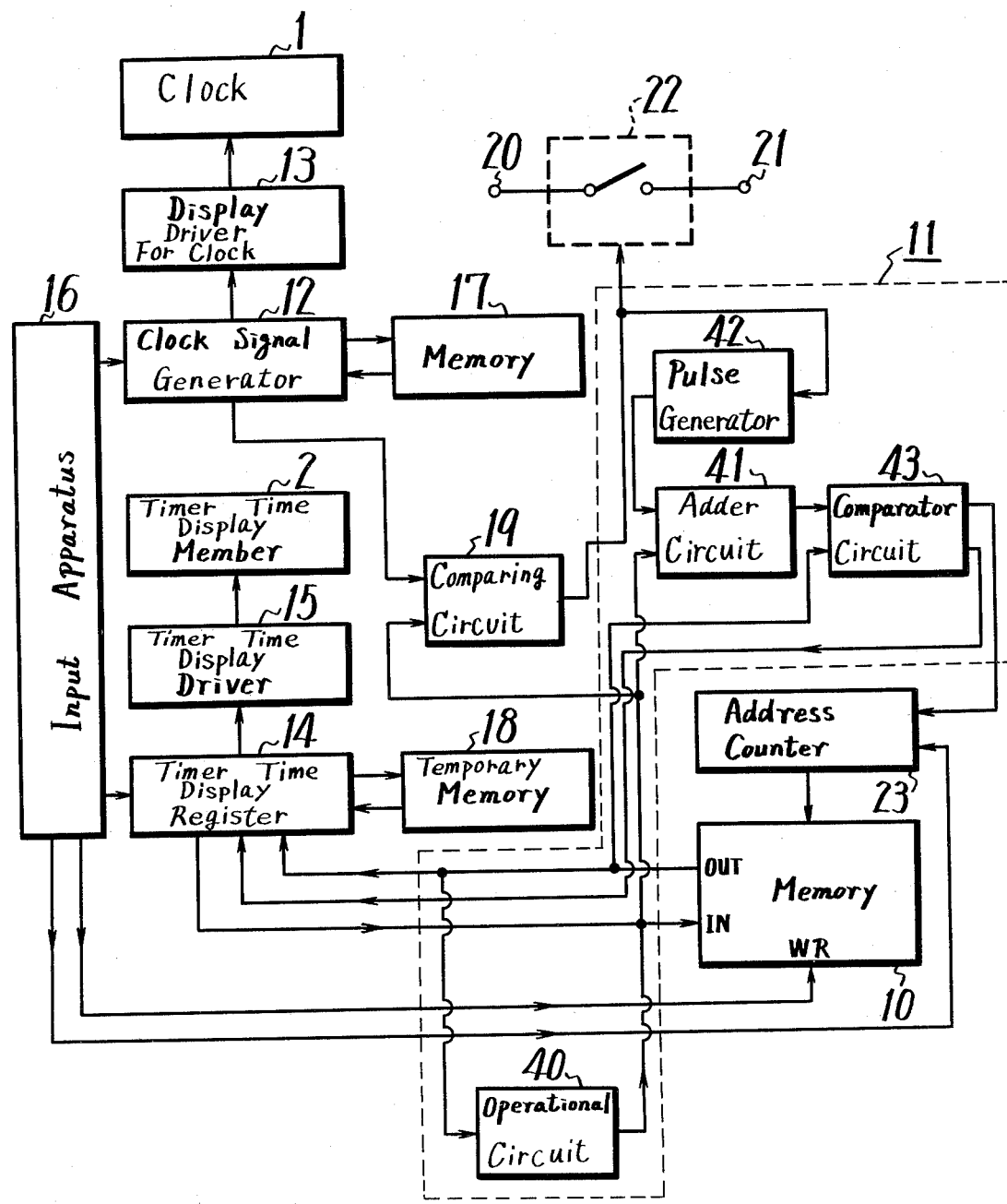
FIG. 4 is a connection diagram showing another example of the circuit for driving the timer display apparatus according to the invention.

Another example of the circuit driving the timer display apparatus according to the present invention will be now described with reference to FIG. 4 in which the parts corresponding to those of FIG. 3 are marked with the same references. In the example of FIG. 4, the discriminating apparatus 11 is different from the discriminating apparatus 11 of FIG. 3. In this example, after ten timer times, for example, are memorized in the memory 10, all the timer times are read out and then fed to an operational circuit 40 to be added with order signals based upon the order of the timer times. Then, the outputs from the operational circuit 40 are memorized in the corresponding memory members of the memory 10. Accordingly, the timer times read out from the memory 10 include the order signals, respectively. The order signal included in the timer time signal, which is the content of the register 14, is supplied to an adder circuit 41. When the comparator circuit 19 delivers the coincident signal, this coincident signal is fed to a pulse generator 42 to control the same such that the pulse generator 42 produces one pulse. This pulse is fed to the adder circuit 41 which then adds a signal of 1 to the order signal. The adder circuit 41 is an adder circuit of decimal corresponding to the number of the memory members of the memory 10. Accordingly, when the number exceeds ten in the adder circuit 10, it returns to one again. The output from the adder circuit 41 is fed to a comparator circuit 43 and therein compared with the order signal of the timer time signal sequentially read out from the memory 10. When both the signals coincide with each other, the comparator circuit 43 supplies its output to the address counter 23 and then the timer time signal read out from the memory 10 is supplied to the register 14. As a result, on the display member 2 displayed is the timer time after but nearest an instant time. The other construction of the example shown in FIG. 4 is substantially the same as that shown in FIG. 3, so that the description thereon will be omitted.

In the subtractor circuit 24 of FIG. 3, it is free that one of the outputs from the clock signal generator 12 and the read out output from the memory 10 is subtracted from the other. In this case, it is enough that the discrimination manner of the discriminator circuit 30, subtractor circuit 33 and discriminator circuits 34 and 36 are varied in response to which output between the outputs from the apparatus 12 and memory 10 is selected as the subtracting signal.

In the example of the invention shown in FIG. 4, when the timer times are written in the respective memory members of the memory 10 in accordance with the order thereof, it is possible to omit the operational circuit 40.

Further, if the timer program buttons 56 and time set buttons 57 of the operating member 50 can be changed by providing a change-over button, one of them can be omitted to reduce the number of buttons.

It will be apparent that many modifications and variations could be effected by one skilled in the art without departing from the spirit or scope of the novel concepts of the present invention, so that the spirit or scope of the invention should be determined by the appended claims only.

We claim as our invention:

1. A timer display apparatus, comprising: memory means capable of memorizing a plurality of timer times; discriminating means for comparing a timer time memorized in said memory means with an instant time and discriminating a timer time after but nearest the instant time; timer time display means for displaying a timer time after but nearest an instant time which is read out from said memory means based upon an output from said discriminating means, wherein said discriminating means includes a subtracter circuit which subtracts said plurality of timer time signals read out from said memory means from a clock signal to produce a difference time, a difference time memory capable of memorizing a plurality of difference times, a discriminator circuit for discriminating whether the difference time is positive or negative, and a data register which provides the smallest absolute value between the positive and negative difference times.

2. A timer display apparatus, comprising: memory means capable of memorizing a plurality of timer times; discriminating means for comparing a timer time memorized in said memory means with an instant time and discriminating a timer time after but nearest the instant time; timer time display means for displaying a timer time after but nearest an instant time which is read out from said memory means based upon an output from said discriminating means; wherein said discriminating means includes an operational circuit which reads out said plurality of timer times memorized in said memory means and adds their orders to the read out timer times, a pulse generator which produces a pulse when an instant time coincides with the timer time, and an adder circuit which adds the outputs from said operational circuit and pulse generator.

* * * * *